Nov. 25, 1969
R. B. HOWELL
3,479,890
SEAT RECLINING MECHANISM
Filed June 29, 1967
3 Sheets-Sheet 1
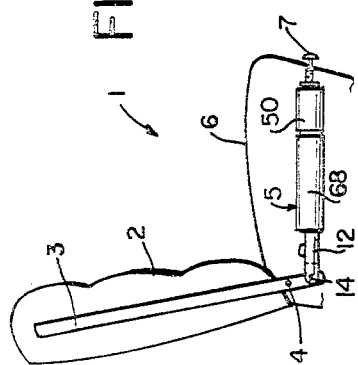
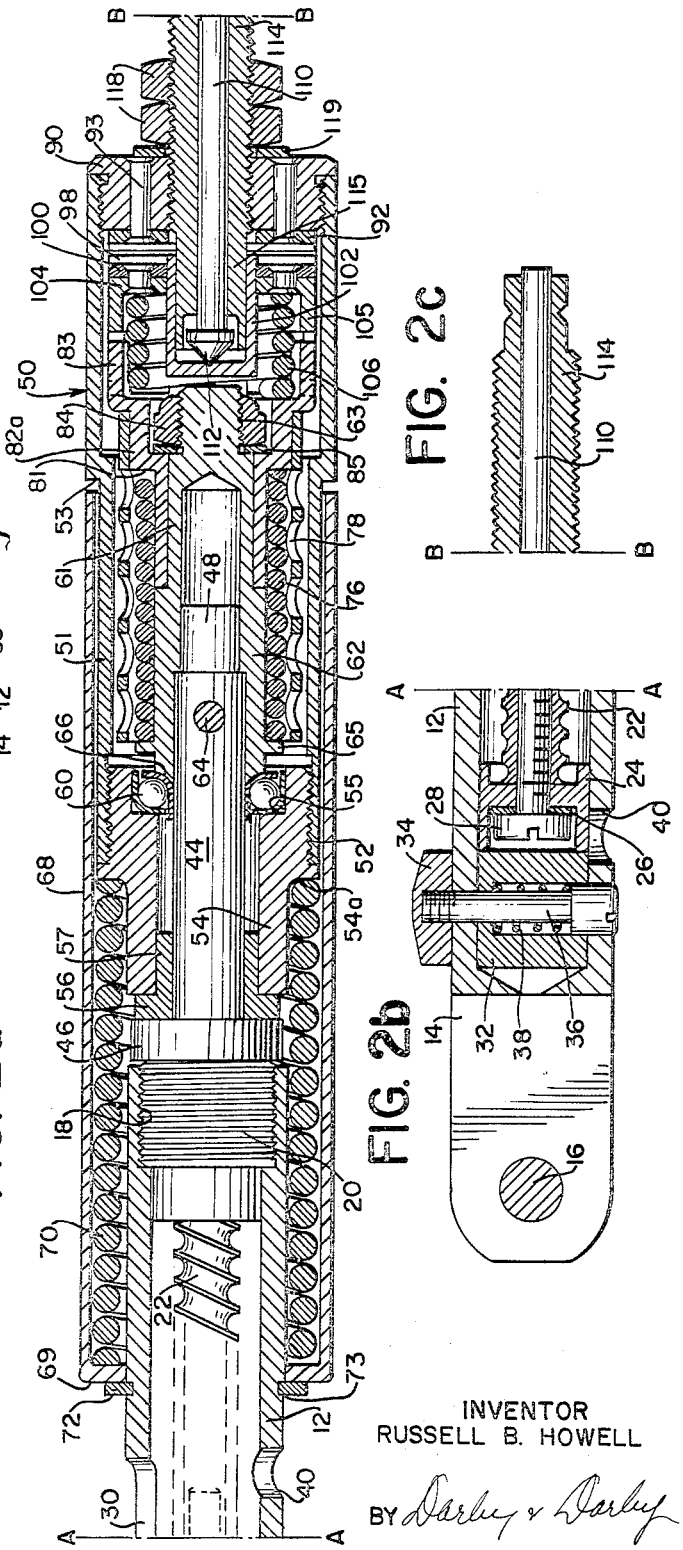
INVENTOR
RUSSELL B. HOWELL
BY Darby & Darby
ATTORNEYS

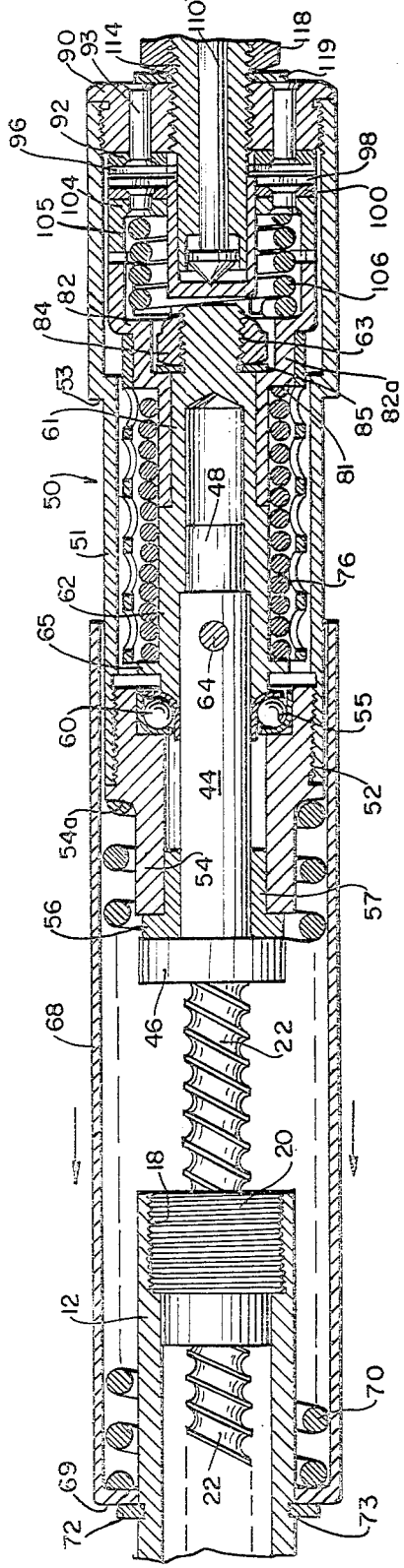

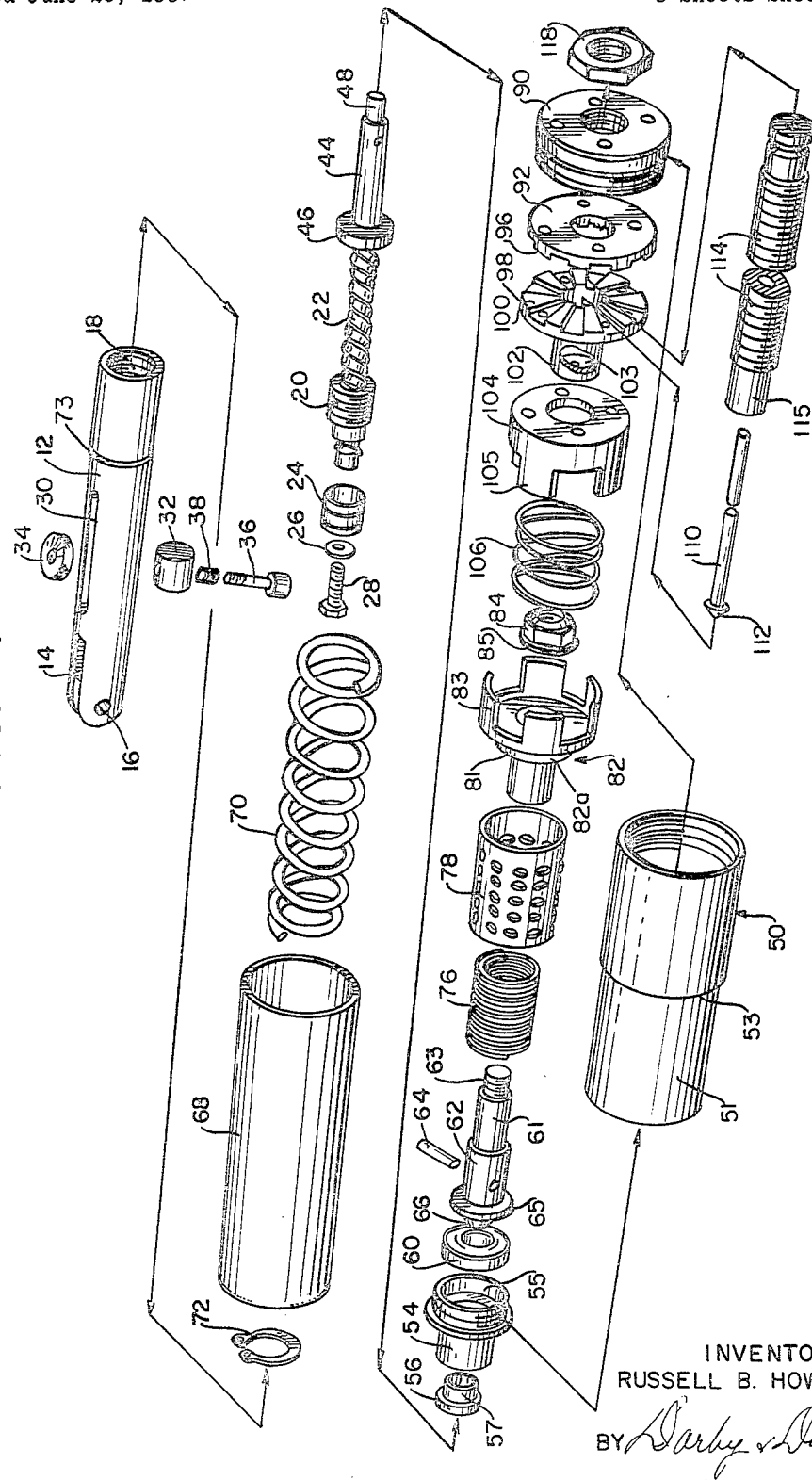

United States Patent Office 3,479,890
Patented Nov. 25, 1969

3,479,890
SEAT RECLINING MECHANISM
Russell B. Howell, Burbank, Calif., assignor to Fairchild Hiller Corporation, Bay Shore, N.Y., a corporation of Maryland
Filed June 29, 1967, Ser. No. 650,052
Int. Cl. F16h 27/62, 1/20
U.S. Cl. 74—89.15                       16 Claims

ABSTRACT OF THE DISCLOSURE

A seat reclining mechanism of the reciprocating type operative for holding the back of a seat in any of an infinite number of positions between a generally upright reference position and a reclining position. The mechanism has an override capacity for a brake which is used to hold the mechanism, and thus the seat, in a predetermined position so that force applied to the seat can release the brake and permit the seat to return to the reference position. Portions of the mechanism are operated in a fluid medium to damp its reciprocating action.

---

Seat reclining mechanisms of the reciprocating type are currently in use in such applications as aircraft seats. These mechanisms are used for the purpose of adjusting the back of a seat to a given position between a reference position (usually upright) and a reclining position, and holding it there. In one such type of seat reclinging mechanism, such as shown in U.S. Patent 3,127,788, a rotatable screw operates in a fixed nut. The screw, as it rotates, extends or retracts an arm of the mechanism which is connected to the seat back. Another part of the mechanism is fixed to a stationary part of the seat frame so that extension or retraction of the mechanism arm lowers and raises the seat back. The screw is normally held against rotation by a brake or clutch which is releasable in one of two ways. In the first, the person in the seat operates a control to release the brake and pressure applied against the seat back by the person will cause it to recline. The mechanism also has a spring return operative with the extendable arm so that releasing the brake cause the spring to return the seat back to the reference position in the absence of an applied force in the opposite direction.

The present invention is directed to improvements in the general type of seat reclining mechanisms described above. More specifically, the present invention provides a seat reclining mechanism in which the reciprocating action of the movable arm is damped by a viscous fluid thus providing the mechanism with a smooth and more restrained reciprocating action. In addition, an improved braking mechanism is provided which permits heavy loading of the mechanism and relatively little effort for brake release.

It is therefore an object of the present invention to provide a seat reclining mechanism whose reciprocating action is damped by the shearing force of a fluid.

A further object is to provide a seat reclining mechanism of the type having a rotatable screw in which a speed control rotor operating in a viscous fluid impedes the screw rotation to damp the reciprocating action of the mechanism.

An additional object is to provide a seat reclining mechanism using a notched or serrated braking surface.

Yet another object is to provide a seat reclining mechanism having an improved brake releasing system.

Other objects and advantages of the present invention will become more apparent upon reference to the following specification and annexed drawings in which:

FIG. 1 is an elevational view, partly broken away, showing the general operation of the reclining mechanism;

FIGS. 2a, 2b, and 2c, taken together, show a cross-sectional view of the reclining mechanism in a retracted position;

FIG. 3 is a portion of the cross-section of the mechanism of FIG. 2 showing it in an extended position; and FIG. 4 is an exploded perspective view of the mechanism.

Referring to FIG. 1 a seat 1 is generally shown as having a back 2 with an upright frame member 3 on each side thereof. The frame members 3 are pivotally connected at 4 to any suitable support such that the back is free to rotate, through a limited arc on the pivots 4. A seat reclining mechanism 5 is mounted within one of the arms 6 of the seat. Mechanism 5 includes a rear tube member 12 which is pivotally mounted by a bifurcated bracket 14 (see FIG. 4) to a point on frame member 3 below the pivot 4. A lock housing 50 of the reclining mechanism is secured at one end to the arm 6, or seat frame (not shown). A cover 68 attached to the rear tube 12 is free to slide over a portion of the lock housing 50.

As can be seen, member 12 can move or reciprocate relative to stationary lock housing 50. Movement of member 12 to the left (extension) moves the seat back 2 clockwise tending to raise it to an upright reference position. Moving member 12 to the right (retraction) pivots seat back 2 in a counter-clockwise direction where it will be reclining. The reclining mechanism 5 is described in detail below but, generally, it can be said that this mechanism also has a brake for holding the mechanism and the seat at any desired position; a control member 7 for releasing the brake, and a spring (not shown) for moving seat back 2 to the reference position by moving member 12 when the brake is released in the absence of any other force applied to the seat back. Of course, when the brake is released a person sitting in the seat and leaning against the back 2 will rotate the back counter-clockwise to a desired reclining position, at which time he will engage the brake again by releasing control 7. This will hold the back in the desired position.

The details of the seat reclining mechanism of the subject invention will be best understood by referring to FIGS. 2–4. As shown, a rear mounting tube 12 has a bifurcated end bracket 14 with a hole 16 for receiving a pivot pin to attach the rear mounting tube to the frame of the seat, as shown in FIG. 1. The other end of the mounting tube 12 has internal threads 18 to receive a nut mechanism 20 which is held stationary against the rotation of a lead screw 22. The nut and screw assembly 20–22 are of any suitable type, for example, as described in U.S. Patents 2,924,112 and 2,938,401. These nuts are commonly referred to as Acme nuts or recirculating ball nuts. The nut operates with a minimum of friction loss in cooperation with the relatively steep threads of the screw.

A guide bearing 24 is attached to the left end of the screw 22 by a washer 26 and a bolt 28. Guide bearing 24 may be of any suitable material such as metal, nylon, Teflon, etc. Bearing 24 serves to stabilize the screw 22 as it moves axially within the rear mounting tube 12.

A slot 30 is also formed in the rear mounting tube 12 to permit adjustable movement of an index stop 32 by releasing an index knob 34. The knob 34 is attached to a headed index pin 36 which is loaded by a spring 38 placed around the pin within an aperture in the index stop. The pin 36 is threaded at one end to engage the corresponding threads of the index knob and has a slotted head to permit the two elements to be tightened. To adjust the position of the index stop 32 it is only necessary to pull up on the knob 34 which retracts the head of the pin 36 into the aperture of the stop and to move the stop to a desired position opposite one of a plurality of stop holes 40 in the tube 12. The knob is then released and the head of the spring loaded index pin will fall into the hole to hold the stop in a fixed position. The purpose of the index stop 32 is to limit the travel to the left of the screw by an abutting relationship between the screw guide 24 and the stop 32.

The right hand end of the screw 22 has an unthreaded shaft 44 formed with a collar 46. Shaft 44 terminates in a reduced diameter end portion 48.

The stationary lock housing 50 has a threaded end 52 which holds a bearing retainer 54 threaded therein. A bearing 56 is fitted over the screw shaft 44 of the screw 22 and has a reduced diameter portion 57 which fits within the central bore of the bearing retainer 54. Bearing 56 is attached to the retainer and its flanged end abuts the collar 46 on the screw shaft 44. The shaft 44 is free to rotate within bearing 56.

The other end of the bearing retainer 54 has a groove 55 which holds a ball bearing race 60. An override control shaft 62 fits over a portion of the screw shaft 44 and is held thereto by a pin 64. The left end of the override control shaft 62 has a shoulder 65 and a tapered portion 66 which fits within the bearing race 60 to hold the bearing in position.

A tubular spring cover 68 having a flanged end 69 fits over the rear mounting tube 12. The other end of the cover 68 is open and is free to move over a reduced diameter portion 51 of the lock housing 50 until it abuts a shoulder 53 which terminates the lock housing reduced diameter portion. A compression type return spring 70 is held between the flanged end 69 of the cover and a shoulder 54a on the bearing retainer 54. The cover's flanged end 69 has its motion to the left, restricted by a lock ring 72 mounted in a groove 73 in the rear mounting tube 12.

As should be apparent, when the screw 22 rotates within the fixed nut 20, it will move the rear tube 12 to the left (extended position) or right (retracted position) depending upon the direction of rotation. When the rear tube moves to the left, it carries the cover 68 with it under the urging of return spring 70. When the tube moves to the right, the cover is carried in the same direction by the lock ring 72, thereby compressing the spring 70.

The override control shaft 62 has a reduced diameter section 61 terminating in a threaded end 63. An override cup 82 is retained on the reduced diameter portion 61 of override control shaft 62 by a washer 85 abutting the shoulder 63 formed by the reduced diameter portion 61 and locked in place by lock nut 84. The override cup 82 is free to rotate on the reduced diameter portion 61 of override control shaft 62 due to its lesser linear dimension and larger inside diameter.

An override spring 76 is placed over the larger diameter portion of the override control shaft. The spring 76 has a tight, or interference, fit to both the larger diameter section of the control shaft 62 and the smaller diameter drum on the left end of the override cup 82. Spring 76 is held between shoulders 65 and 81 of the pieces 62 and 82. A speed control sleeve or rotor 78 is placed over the spring. The rotor fits tightly over and is held by an enlarged diameter portion 82a on the override cup 82. For reasons described below, the rotor has a number of holes, slots, vanes, flutes, etc.

As seen in FIG. 4, the override cup 82 has a plurality of spaced fingers 83 extending therearound which are generally parallel to the longitudinal axis of the reclining mechanism. The purpose of these fingers is described in detail below.

A mounting cap 90 is threaded into the right-hand end of the lock housing 50. A brake, or clutch, member 92 is fixedly mounted to the inner face of the mounting cap by any suitable means such a plurality of screws or rivets 93. As seen best in FIG. 4 the brake member 92 has a serrated or notched surface 96 to mate with a complementary surface 100 of another movable brake, or clutch member 98. The latter brake member 98 has a reduced diameter neck 102 which fits within a central aperture in a brake pressure, or guide, cup 104. The second brake member 98 has its face held to the cup 104 by any suitable means, for example, screws, rivets or brazing.

The pressure cup 104 has fingers 105 which are complementary to and fit within the spaces between the fingers 83 of the override cup 82. A control spring 106 of the compression type is held between the opposing faces of the override cup 82 and the pressure cup 104. It should be apparent that the spring 106 normally acts to urge the cup 104 to the right so that the operative faces of the members 92 and 98 are brought into an engaging relationship.

A control rod 110 having a conical left end 112 fits within the central bore of a mounting screw 114, a portion 115 of whose outer surface is unthreaded. The mounting screw 114 with the control rod 110 held therein is screwed into the front mounting cap 90 of the lock housing so that its unthreaded portion 115 passes through the central openings in both braking members 92 and 98 and its threads are clear of these two members. Mounting screw 114 is fixably held to the mounting cap by a pair of nuts 118 and washer 119. The conical end 112 of the control shaft is free to move axially against the rear wall 103 of the neck 102 of the brake member 98. Adjustment of the control rod stroke is accomplished by rotating the mounting scew 114 into and out of the cover 90 and then tightening the nuts 118.

The entire lock housing 50 is filled with a fluid of heavy viscosity. Thus, all of the parts in the lock housing operate smoothly in the fluid. As described in greater detail below, the fluid also damps the action of the screw due to the presence of the rotor 78.

A control knob (not shown) is attached to the right end of the control rod for operation by the passenger sitting in the seat. When the passenger presses the control knob, control shaft 110 is moved to the left carrying with it brake member 98 to release the brake and thereby permit the screw to rotate. When there is no pressure on the control knob, the control spring urges the guide cup 104 to the right causing engaging of the two members 92 and 100. The screw is restricted against turning under the latter condition.

As should be apparent, the override control mechanism of spring 76 engaging the enlarged diameter drum of override control shaft 62 and the reduced diameter portion of override cup 82 in which the front reduced diameter portion of shaft 62 can rotate also performs a braking function. When the screw 22 is rotated to turn control shaft in one direction the override spring 76 is wound up more tightly thereby gripping the override cup 82 so that the override control shaft 62 and override cup 82 turn as one unit. When the screw 22 is rotated in the other direction, the spring 76 unwinds and permits the override control shaft 62, carried by the screw 22, to rotate relative to the override cup 82. The fingers 83 of cup 82 are engaged and held by the fingers 105 of cup 104.

Considering now the operation of the reclining mechanism of FIGS. 2–4, it is assumed that the mechanism is mounted in a seat in the manner shown in FIG. 1. When the brake, formed by members 92 and 98, is engaged, that is, control rod 110 not actuated, the control spring 106 acting between the guide cup 104 and the override cup 82 urges the guide cup and brake member 98 to the right into engagement with brake member 92. With a person sitting in the seat and leaning against the back, the screw 22 is tended to be rotated in a direction to wind up the override spring 76 more tightly. Since the fingers 83 and 105 of the cups interlock, the screw 22 is prevented from rotating by the engaging brake 92 and 98 because the override control spring 76 prevents shaft 62 from rotating relative to override cup 82. The override control shaft 62, which is pinned to the unthreaded end 44 of the screw shaft, is braked and the screw 22 is prevented from turning. Thus, when the brake 92, 98 is engaged, the seat can be held in any desired position since the screw 22 is prevented from rotating which in turn holds the rear tube member 12 stationary with respect to the lock housing 50.

The brake is released by moving the control rod 110 to the left. This causes the conical end 112 of the control rod to engage wall 103 of the brake member 98 which carries this member and attached guide cup 104 to the left, compressing control spring 106 and freeing the brake 92, 98. The screw 22 is now free to rotate to extend or retract the end tube 12, as the case may be.

Consider first the situation with the brake 92, 98 released by control rod 110 and a force applied to the seat back to pivot it in a counter-clockwise direction (FIG. 1). This moves the rear tube 12 to the right as shown in FIG. 2 compressing return spring 70 between the flange 69 on the cover 68 and the shoulder 54a of bearing retainer 54. As should be apparent, the screw 22 is free to rotate in the fixed nut 20 as the rear tube 12 carrying the nut moves to the right. Travel of the rear tube to the right, that is, the extent to which the seat back can recline, is limited by the screw-guide bearing 24 hitting stop 32. As indicated above, the position of the stop is adjustable. This action continues until either the application of the counter-clockwise force on the seat back ceases and/or control rod 110 is released. When the former occurs, the seat back will tend to return to its reference position in a manner to be described below. When the control rod 110 is released, control spring 106 again engages the brake locking the rear tube 12 of the mechanism at the position it had when the control rod was released.

With the brake released by the control rod 110 and no counter-clockwise force applied to the seat back, the return spring 70 expands and acting against cover flange 69 and lock ring 73 it carries the rear tube 12 to the left to an extended position. This raises the seat back toward the upright position. If the brake is not engaged as the seat back is rising, the seat back will reach a full upright position. The seat recliner is shown in this condition in FIG. 3.

As indicated previously the lock housing 50 is filled with a fluid of heavy viscosity. This fluid provides a resistance to rotary movement of the speed control sleeve or rotor 78. This sleeve has a number of holes, or a fluted, slotted, vaned, spiraled or other textured surface to increase the resistance by a shearing force as the sleeve rotates in the fluid. The selection of the rotor surface configuration depends upon the resistance required by the rotor or the shear action required as the rotor rotates within the fluid. Since the sleeve is attached to the override cup 82 and rotates with it, the rotation of the screw 22 is slowed or damped. This damps the reciprocating action of the reclining mechanism making it somewhat slower, but smoother acting.

The fluid within the lock housing also serves to lubricate the parts within the housing. As should be apparent, the fluid cannot leak out since the housing is sealed on one end of the bearing retainer 54, bearing 56 and the shoulder 65 of the override control shaft and on the other end by the front mounting screw 114 and mounting cap 90.

The brake mechanism is designed to take advantage of the heavy viscosity fluid within the lock housing by using the notched opposing surfaces shown or some other textured or serrated surface which will not slip in the presence of the fluid. As shown the extending flat surfaces of the brake members are held in concentric and parallel relationship with the extending flat surfaces of fixed brake member 92 by the cylinder 102 of clutch member 98 which slides on the unthreaded portion 115 of the mounting screw. This, and the operation in the fluid, eliminates any chattering or grinding of surfaces.

The brake mechanism can withstand relatively heavy loads without slipping. Only a very short stroke of the control rod 110, which is adjustable, to clear the opposing engaging portions of the faces of the brake members from each other, is needed to release the brake. The force needed to produce this stroke is relatively light since only the force of control spring 106 need be overcome.

It is desired that the recliner mechanism have an override capacity so that when clockwise pressure (FIG. 1) is applied to the seat back of a reclined seat, the brake will release and the back will be raised to the reference position. The clockwise pressure is usually applied by a hostess or cleaning personnel who wish to raise all seat backs to the reference position in a short period of time without pushing the control rods 110 of the seats.

Clockwise pressure applied to a reclined seat back tends to rotate the screw 22 in a direction to extend the rear tube 12. This rotation would be clockwise viewed from the control rod end of the mechanism. As explained previously, the override spring 76 has an interference fit with the rear drum portion of override cup 82 and the outer surface of the override control shaft 62. As the override control shaft rotates with the screw in response to the clockwise pressure, the override spring 76 will tend to unwind. The turns of the spring coil are wound in a direction to produce this action. This permits the override control shaft 62 and the screw 22 to rotate relative to the override cup 82. The return spring 70 aids in the rotation of the screw with the clockwise force applied until the seat reaches the reference position.

When force is applied to the seat back in the counter-clockwise direction, such as by a person in the seat leaning against the seat back, the screw 22 is tended to be rotated in the counter-clockwise direction. As indicated previously, this causes the spring 76 to hold the override cup 82 firmly to the control shaft 62 and thereby bring the brake 92, 98 into operative relationship.

The override spring 76 can be a single coil torsion spring, as shown in FIGS. 2 and 3, or a torsion spring with two or more coils interwound as shown in FIG. 4. The load required dictates the size and/or number of springs used. Two or more interwound coil springs, as shown in FIG. 4, give increased load capacity with less spring diameter.

The indexing mechanism (FIG. 2b) for stopping the travel of the rear tube 12 is a convenience feature which is especially useful where the seat is adjacent a door or an escape hatch. The index stop 32 limits the reclining position of the seat back and its position can be adjusted simply by pulling up on knob 34 and moving the pin 36 to a desired hole 40. The knob 36 is then released setting the stop 32 at a predetermined position.

While a preferred embodiment of the invention has been described above, it will be understood that this is illustrative only, and the invention is limited solely by the appended claims.

What is claimed is:

1. A seat reclining mechanism comprising:
first and second members which are extensible relative to one another,
a nut carried by one member and a screw rotating in cooperation with the nut, said screw having a portion extending into said other member, rotation of the screw moving one member axially relative to the other member,
first brake means fixedly attached to said other member and a second brake means carried by said screw extending portion,
means for normally urging said brake means into an engaging relationship to thereby prevent rotation of the screw,
means for releasing said brake means to thereby permit the screw to rotate, and means separate from said brake means carried by said screw and rotatable with said screw, for damping the rotation of the screw.

2. A seat reclining mechanism as in claim 1 wherein said means for retarding rotation of the screw further comprises a viscous material within said other member of the mechanism.

3. A seat reclining mechanism as set forth in claim 2 where said means carried by said screw comprises a sleeve, said sleeve having a surface which prevents a relatively high resistance to rotation in the viscous material as the screw rotates.

4. A seat reclining mechanism as set forth in claim 3 wherein said sleeve has a plurality of apertures spaced around its surface.

5. A seat reclining mechanism as set forth in claim 3 wherein said clutch means also operate in said viscous material.

6. A seat reclining mechanism comprising:
   first and second members which are extensible relative to one another,
   a nut carried by one member and a screw rotating in cooperation with the nut, said screw having a portion extending into said other member, rotation of the screw moving one member axially relative to the other member,
   first brake means fixedly attached to said other member,
   second brake means for engagement with said first clutch means, and
   means for mounting said second brake means on said extending portion of said screw for permitting rotation of the screw relative to said second brake means when said screw rotates in one direction and fixedly holding said second brake means to said screw to rotate therewith when the screw is rotated in the other direction.

7. A seat reclining mechanism as in claim 6 further comprising means for normally urging said first and second brake means toward one another to bring their opposing faces into braking engagement to prevent rotation of the screw.

8. A seat reclining mechanism as set forth in claim 7 wherein the opposing faces of said first and second brake means have interengaging means thereon, and
   means for moving said second brake means relative to said first brake means by a distance sufficient to clear the interengaging means of the opposing faces to thereby permit rotation of the screw.

9. A seat reclining mechanism as set forth in claim 7 further comprising means for connection to said second brake means, and said mounting means comprises a torsion spring engaging both said screw and said connection means, said torsion spring tending to unwind when the screw is rotated in said one direction and to wind when said screw is rotated in said other direction.

10. A seat reclining mechanism as set forth in claim 9 wherein said torsion spring comprises a pair of interwound coils.

11. A seat reclining mechanism as set forth in claim 9 wherein said connection means includes a first cup mounted on said screw extending portion to be relatively rotatable therewith, said torsion spring engaging said screw and said first cup.

12. A seat reclining mechanism as set forth in claim 11 further comprising a second cup, said second brake means mounted on said second cup, and interengaging means on said first and second cups, said urging means located between said first and second cups.

13. A seat reclining mechanism as set forth in claim 1 further comprising indexing means for limiting the travel of the screw and the retraction of said first and second members relative to each other.

14. A seat reclining mechanism as set forth in claim 7 further comprising means for damping the rotation of said screw including a sleeve having a high resistance surface mounted for rotation with said screw, a housing within which said screw and said sleeve are located, and a viscous material within said housing in which said sleeve rotates.

15. A seat reclining mechanism as set forth in claim 9 further comprising means for damping the rotation of said screw including a sleeve having a high resistance surface mounted for rotation with said screw, a housing within which said screw and said sleeve are located, and a viscous material within said housing in which said sleeve rotates.

16. A seat reclining mechanism as in claim 15 wherein said sleeve lies over said torsion spring.

References Cited
UNITED STATES PATENTS

| | | | |
|---|---|---|---|
| 2,579,305 | 12/1951 | Cushman | 297—361 |
| 3,127,788 | 4/1964 | Martens | 74—586 |
| 3,269,199 | 8/1966 | Deehan et al. | 74—89.15 |
| 2,857,775 | 10/1958 | Ochtman | 74—424.8 |

FRED C. MATTERN, JR., Primary Examiner

F. D. SHOEMAKER, Assistant Examiner

U.S. Cl. X.R.

74—424.6, 586